（12） United States Patent
Takayama et al.

(10) Patent No.: US 6,425,312 B2
(45) Date of Patent: Jul. 30, 2002

(54) BRAKE BOOSTER

(75) Inventors: Toshio Takayama; Kunihiro Matsunaga; Takuya Obata, all of Yamanashi-ken (JP)

(73) Assignee: Tokico, Ltd. (JP)

( * ) Notice: Subject to any disclaimer, the term of this patent is extended or adjusted under 35 U.S.C. 154(b) by 0 days.

(21) Appl. No.: 09/814,375

(22) Filed: Mar. 21, 2001

(30) Foreign Application Priority Data

Mar. 31, 2000 (JP) ....................................... 2000-099478

(51) Int. Cl.$^7$ ............................................... F15B 13/16
(52) U.S. Cl. .......................................................... 91/367
(58) Field of Search .............................. 91/367, 369.2, 91/370

(56) References Cited

U.S. PATENT DOCUMENTS

| | | | |
|---|---|---|---|
| 5,611,257 A | * | 3/1997 | Eick .............................. 91/367 |
| 5,711,202 A | * | 1/1998 | Tsubouchi ..................... 91/367 |
| 5,845,556 A | * | 12/1998 | Tsubouchi et al. ............. 91/367 |
| 6,119,577 A | * | 9/2000 | Takasaki et al. ............... 91/367 |
| 6,135,007 A | * | 10/2000 | Tsubouchi .................. 91/369.2 |
| 6,155,156 A | * | 12/2000 | Takasaki et al. ............... 91/367 |
| 6,250,200 B1 | * | 6/2001 | Ikeda et al. ..................... 91/367 |
| 6,311,606 B1 | * | 11/2001 | Tsubouchi et al. ............. 91/367 |
| 6,321,633 B1 | * | 11/2001 | Takayama et al. ............. 91/367 |
| 6,332,391 B1 | * | 12/2001 | Ikeda et al. ..................... 91/367 |
| 6,345,565 B1 | * | 2/2002 | Tsubouchi et al. ............. 91/367 |
| 6,347,570 B1 | * | 2/2002 | Inoue et al. .................... 91/367 |

* cited by examiner

*Primary Examiner*—John E. Ryznic
(74) *Attorney, Agent, or Firm*—Brinks Hofer Gilson & Lione

(57) ABSTRACT

The present invention provides a brake booster that, although simple in construction, capable of adjusting the braking force derived by operation of a solenoid mechanism without worsening the braking response. In the brake booster according to the present invention, when a movable member (34) is shifted toward the rear side by electromagnetic force of a solenoid (31), the shifting movement is transmitted to a valve seat member (21) through pins (50) to open an atmospheric valve (27) through which air is introduced into a variable pressure chamber (9,10), whereby a pressure difference is created between the variable pressure chamber and a constant pressure chamber and generates booster output (thrust output force). In the present invention, pressure in the constant pressure chamber is introduced into a chamber (54) formed at one end of the movable member (34) through a passage (56), and atmosphere is introduced into a chamber (55) formed at the other end of the movable member (34) through a passage (57), thereby exerting on the movable member (34) a reaction force caused by the pressure difference between the variable pressure chamber and the constant pressure chamber. Thus, the booster output becomes proportional to the electric current supplied to the solenoid (31). Further in the present invention, the size of the passage (57) is determined properly so as to limit air introduced therethrough into the chamber (54) and keep the reaction force small until the booster output reaches an adequately level, thereby preventing the breaking response from deteriorating.

12 Claims, 4 Drawing Sheets

BRAKE BOOSTER

BACKGROUND OF THE INVENTION

The present invention relates to a control-type brake booster capable of automatically increasing and decreasing braking power by electromagnetically operating an atmospheric valve or vacuum valve.

An example of such a brake booster is disclosed in Japanese Patent Laid-open No. 7-503214 (1995), in which a valve body contains a solenoid mechanism with a member movable by applying electricity to the solenoid of the solenoid mechanism, and a movement of the movable member opens a valve mechanism, which may be an atmospheric valve or vacuum valve, independently of the valve operation by movements of the input rod connected to the brake pedal.

It has been desired that as is the braking power output from a brake booster when its valve mechanism is operated by movements of the input rod connected to the brake pedal, the braking power output from a brake booster having the above-mentioned solenoid mechanism can also be adjusted across a wide range when operated by the activation of the solenoid mechanism.

However, in the above-mentioned conventional brake booster, the solenoid mechanism merely functions to open the valve mechanism to the degree determined by the magnitude of electric current supplied to the solenoid, and no correlation (or proportional relationship) exists between the magnitude of the electric current supplied to the solenoid mechanism and the magnitude of the braking power output from the brake booster.

As a makeshift measure to obtain a desired magnitude of braking power from a brake booster when its solenoid mechanism is operated is to control the operation of the solenoid mechanism based on a feed-back signal indicating the braking power being output from the brake booster, for instance, on an output signal from a master cylinder pressure sensor provided for detecting pressure of braking liquid output from the master cylinder.

However, since an additional sensor is required that functions like the master cylinder pressure sensor to output a signal indicating the braking power being output from the brake booster, the entire system becomes more expensive.

SUMMARY OF THE INVENTION

The present invention aims to eliminate the drawbacks in the above-mentioned conventional brake booster. An object of the present invention is to provide a brake booster that, while being simple in construction, can fully adjust the braking power across a wide range when its solenoid mechanism is operated.

According to one aspect of the present invention, there is provided a brake booster wherein an interior of a shell is divided into a constant pressure chamber and a variable pressure chamber by a power piston, and a valve mechanism for controlling supply of operating fluid to the variable pressure chamber by a shifting movement of a plunger connected to an input rod cooperating with a brake pedal is provided within a valve body supported by the power piston, so that a thrust force generated on the power piston by pressure difference between the variable pressure chamber and the constant pressure chamber based on an operation of the valve mechanism is output as a booster output force (thrust output force).

The brake booster further comprises an electromagnetic biasing means having a movable member for operating the valve mechanism independently from an operation of the input rod, and a reaction force mechanism for applying reaction force corresponding to the pressure difference between the variable pressure chamber and the constant pressure chamber to the movable member, whereby the reaction force mechanism applies the reaction force to the movable member so that an increasing rate of the booster output force is in accord with an increasing rate of the reaction force applied to the movable member.

According to another aspect of the present invention, in a brake booster having the electromagnetic biasing means mentioned above and the reaction force mechanism mentioned above, the reaction force mechanism applies the reaction force to the movable member at the same time or with a delay after the booster outputs force.

In the above two aspects of the present invention in which the reaction force corresponding to the pressure difference between the variable pressure chamber and the constant pressure chamber is exerted on the movable member, the booster output force becomes proportional to the magnitude of the electric current supplied to the electromagnetic biasing mechanism. Further, since the reaction force is exerted on the movable member so that the booster output force increasing rate is in accord with the reaction force increasing rate acting on the movable member, or, so that the reaction force is created at the same time or after the booster output force is generated, the booster output force generated is not prevented by the reaction force.

In the present invention, the reaction force mechanism is provided with at least one passage providing communication between a pressure chamber formed at one end of the movable member and the variable pressure chamber. The at least one passage has a limited flow area for limiting air flowing into the pressure chamber. Preferably, the total flow area of the passage is designed 0.5–10 square millimeters.

Limiting the flow area of the passage as above, the timing of the reaction force exerted on the movable member is adjusted properly, and thus a better response of automatic braking can be established.

DETAILED DESCRIPTION OF THE INVENTION

Figure 1:
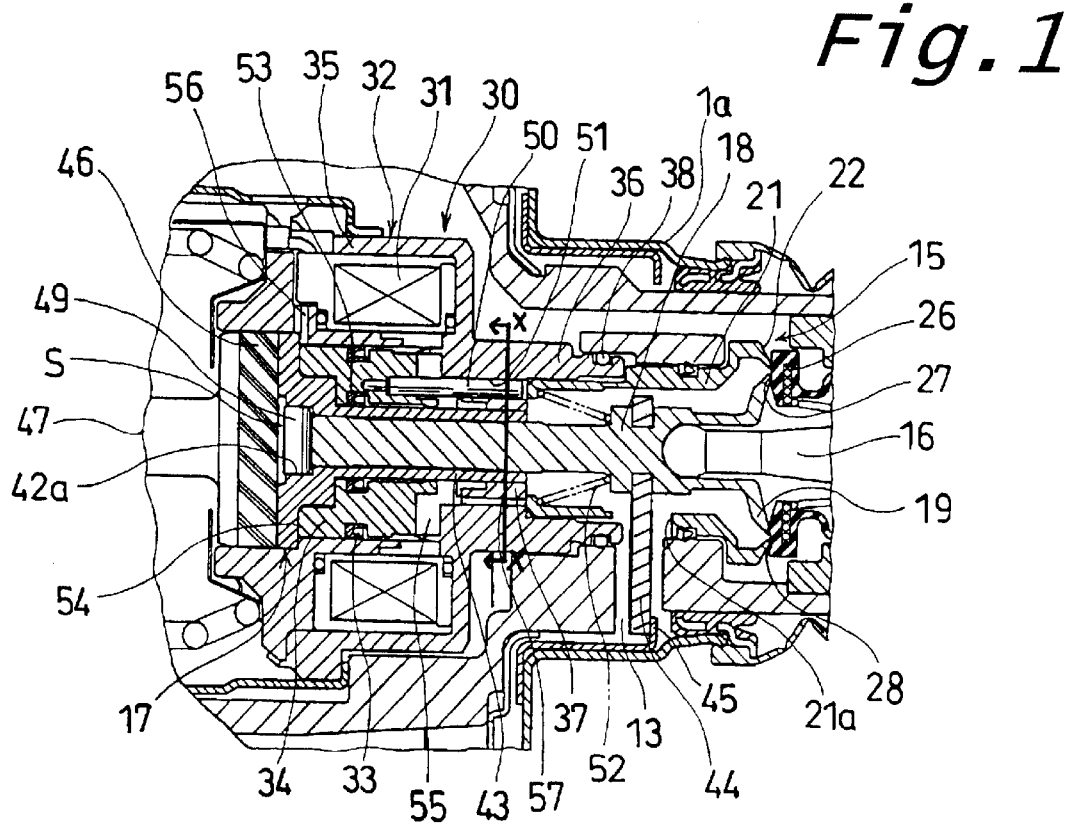
FIG. 1 is a partially enlarged sectional view showing a brake booster of one embodiment according to the present invention (a partial enlarged view of FIG. 2)
Figure 2:
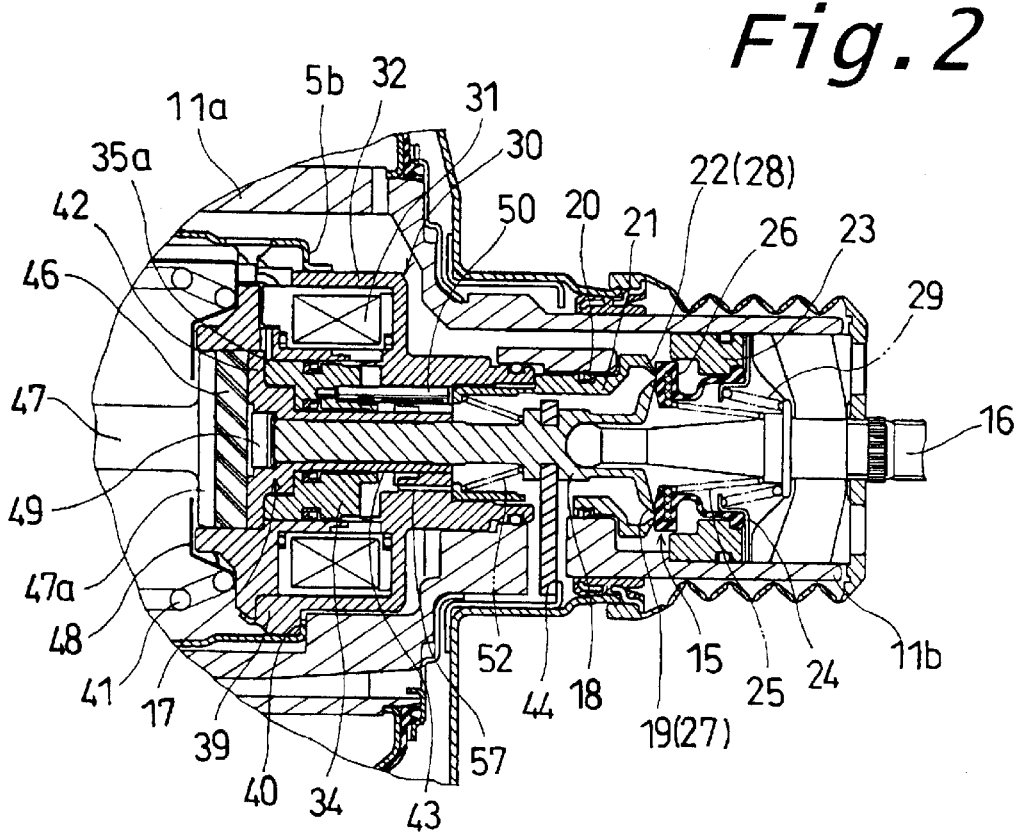
FIG. 2 is a partial sectional view showing the brake booster of the same embodiment according to the present invention (a partially enlarged view of FIG. 3)

Now, a brake booster according to an embodiment of the present invention will be explained with reference to FIGS. 1 through 4.

A brake booster shown on FIGS. 1 through 4 is a tandem type and has a shell 1 which is divided into a front chamber and a rear chamber by a center shell 2. These two respective chambers are further divided into constant pressure chambers 7,8 and variable pressure chambers 9,10 by power pistons 5,6 having diaphragms 3,4. The power pistons 5,6 support a valve body 11 that comprises a large diameter cup portion 11a and a small diameter cylindrical portion 11b connected thereto. The valve body 11 is disposed such that the cup portion 11a thereof sealingly and slidably passes through the center shell 2, and that the cylindrical portion 11b thereof sealingly and slidably passes through a cylindrical support portion 1a arranged on the rear side of the shell 1 and extends rearwardly of the support portion.

The valve body 11 is formed with a constant pressure passage (negative pressure passage) 12 that provides communication between the two constant pressure chambers 7 and 8 and between the constant pressure chambers 7,8 and the inside of the cylindrical portion 11b of the valve body 11. The valve body 11 is also formed with an atmosphere passage 13 that provides communication between the two variable pressure chambers 9 and 10 and between the two variable pressure chambers 9,10 and the inside of the cylindrical portion 11b of the valve body 11. Negative pressure, e.g. negative pressure from the engine, is introduced into the constant pressure chamber 7 shown on the left side (front side) of the FIGURES. The negative pressure is also introduced into the constant pressure chamber 8 shown on the right side (rear side) of the Figures via the negative pressure passage 12. On the other hand, the atmosphere is introduced into the cylindrical portion 11b of the valve body 11 through a filter unit 14 having a silencing function. The atmosphere is supplied into the two variable pressure chambers 9 and 10 through the atmosphere passage 13 by operation of valve mechanism 15 (as described later).

The valve mechanism 15 is connected to an input rod 16 cooperating with a brake pedal (not shown), which comprises: a plunger 18 slidable along a hollow guide 17 (as described later) disposed in the valve body 11; an annular atmospheric valve seat 19 formed at rear end of the plunger 18; a cylindrical valve seat member 21 slidably inserted into the valve body 11 via a seal member 20; an annular negative pressure valve seat 22 formed at rear end of the valve seat member 21, a poppet valve 26 whose proximal end portion is fixed to the cylindrical portion 11b of the valve body 11 by means of a ring member 23 and a pressing member 24 and which is usually biased to sit on the atmospheric valve seat 19 and the negative pressure valve seat 22 by means of a valve spring 25 held at one end thereof onto the input rod 16. The atmospheric valve seat 19 and the annular inner portion formed at the distal end of the poppet valve 26 resting thereon constitute an atmospheric valve 27. The negative pressure valve seat 22 and the annular outer portion formed at the distal end of the poppet valve 26 resting thereon constitute a vacuum valve 28. The atmosphere or the negative pressure is selectably supplied into the two variable pressure chambers 9,10 when the atmospheric valve 27 or the vacuum valve 28 is opened, respectively. Meanwhile, a return spring 29 is placed between the pressing member 24 and the input rod 16 (see FIG. 2). The plunger 18 is forced so as to abut the atmospheric valve seat 19 onto the poppet valve 26 by a biasing force of the return spring 29 and the valve spring 25 during a rest state of the brake booster.

Figure 3:
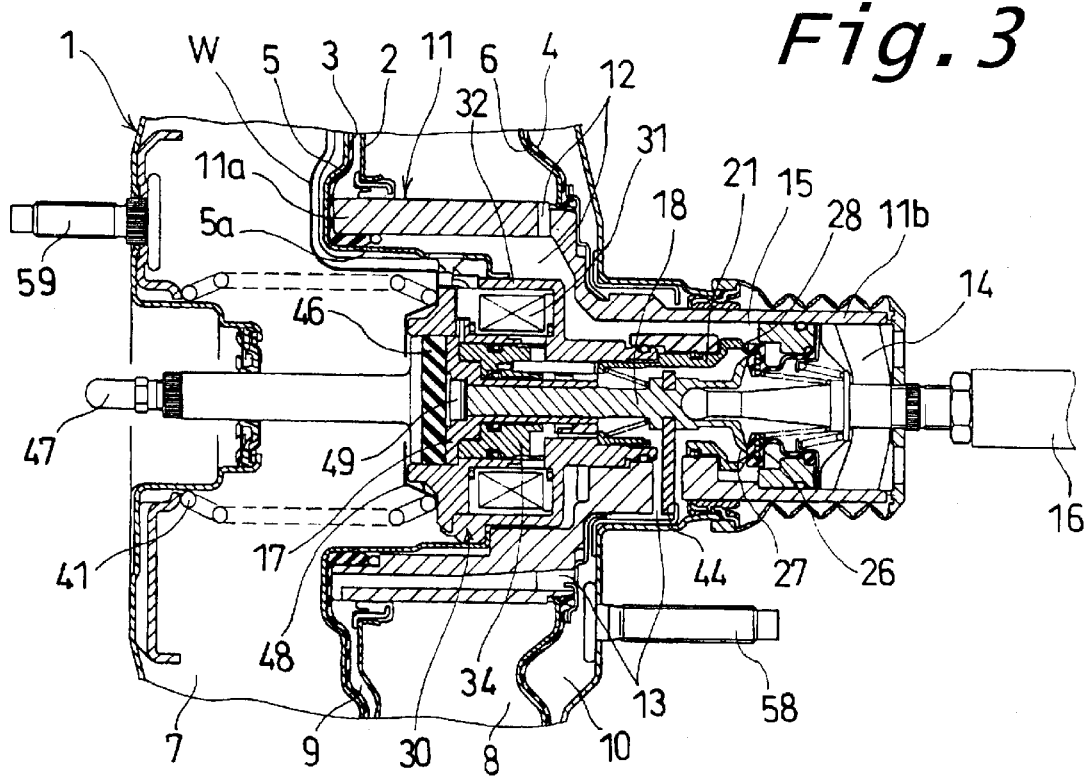
FIG. 3 is a sectional view showing the brake booster of the same embodiment of the present invention.
Figure 4:
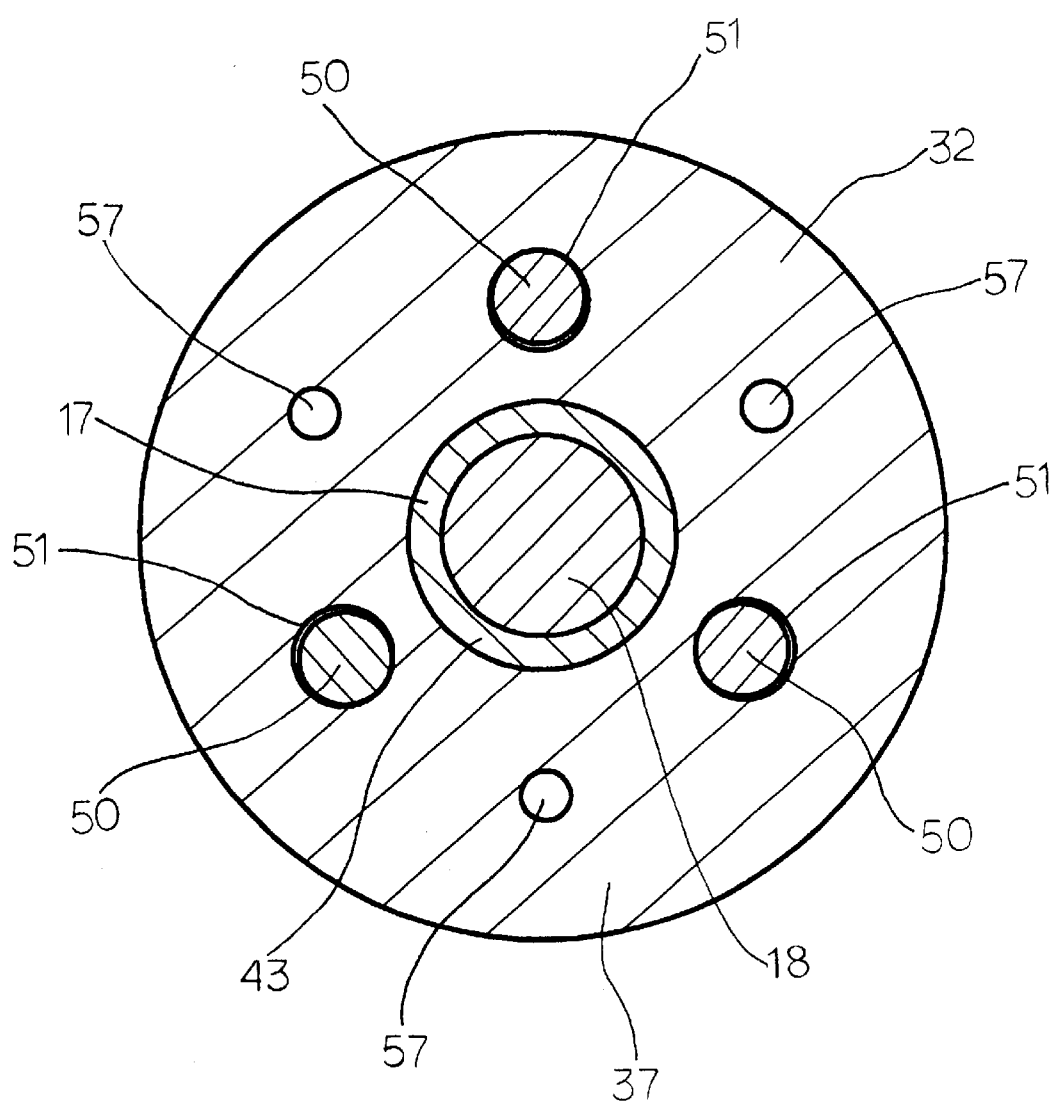
FIG. 4 is an enlarged cross-sectional view of X—X line in FIG. 1.

A solenoid mechanism (electromagnetic biasing means) 30 is disposed in the cup portion 11a of the valve body 11. The solenoid mechanism 30 substantially comprises: a solenoid 31; a housing 32 containing the solenoid 31 therein; and an annular movable member (an armature) 34 having a seal member 33 in the housing 32 (see FIG. 1) and being slidably disposed in the housing 32. The housing 32 comprises: a double cylindrical shaped main body portion 35 containing the solenoid 31 therein; an extension cylindrical portion 36 extending rearward from the rear end of the main body portion 36; and a separating portion 37 separating the main body portion 35 thereof from the extension cylindrical portion 36. While the extension cylindrical portion 36 of the housing 32 is inserted into the inner surface of the valve body 11 via a seal member 38, and a flange portion 39 formed on the outer circumference surface of the main body portion 35 rests on a step portion 40 formed on the inner surface of the cup portion 11a of the valve body 11, the housing 32 is restrained in its movement against the valve body 11 by biasing force of a return spring 41 disposed in the constant pressure chamber 7 provided on the front side. An inner flange 5b is provided on a cylindrical portion 5a of the power piston 5 provided on the front side (see FIG. 1) and is interposed between the flange portion 39 and the step portion 40. Thus, the valve body 11 and the housing 32 move together in the axial direction. In FIG. 3, reference mark "W" is a wire for supplying electricity to the solenoid 31. The wire "W" usually extends outside of the brake booster via a connector (not shown) disposed in the front face of the shell 1.

The hollow guide 17 is disposed inside of the main body 35 of the housing 32. The hollow guide 17 comprises a large end portion 42 engaged with a step portion 35a of the main body 35 and a small diameter axis portion 43 extending from the large end portion 42 rearwardly through the separating portion 37 of the housing 32 (see FIG. 2). The plunger 18 is slidably inserted into the small diameter axis portion 43. A stop key 44 extending the radial direction is inserted into the valve body 11 through the atmosphere passage 13, and the distal end portion of the stop key 44 is connected to the plunger 18. The proximal end portion of the stop key 44 is arranged to abut against a stopper plate 45 (see FIG. 1) fixed on a cylindrical support portion 1a of the shell 1. The maximum setback position of the plunger 18 is the position where the stop key 44 abuts against the stopper plate 45. The stop key 44 is also inserted through a opening (long face hole) 21a. The valve seat member 21 is allowed to move relatively to the plunger 18 within the range where the stop key 44 is movable within the opening 21a.

A reaction disk 46 and a large diameter proximal end portion 47a of an output rod 47 are disposed on the forward side of the step portion 35a of the main body 35 of the housing 32. The distal end portion of the output rod 47 is extended forwardly through the front side of the shell 1 air-tightly. The distal end portion of the output rod 47 is connected to and is simultaneously moved with a piston of a master cylinder (not shown). Further, the proximal end large diameter portion 47a of the output rod 47 and the reaction disk 46 are restrained from coming out of the housing 32 by means of a retainer 48 press-fixed on the front end of the valve body 11 by means of the return spring 41. A recess 42a is formed in the front face of the large end portion 42 of the hollow guide 17. A pressure receiving plate 49 is disposed in the recess 42a. A depth of the recess 42a is designed slightly more than the thickness of the pressure receiving plate 49. The front end of the plunger 18 is located slightly forwardly from the bottom of the recess 42a when the brake booster is in its rest state. A little gap "S" (see FIG. 1) is formed between the pressure receiving plate 49 and the reaction disk 46 in such a state.

There are pins 50 one ends of which are inserted and fixed into the movable member 34 of the solenoid mechanism 30 and the other ends of which are inserted into through-holes 51 formed in the separating portion 37 in the housing 32. The valve seat member 21 having the negative pressure valve seat 22 at its rear end is urged forwardly by means of a spring 52 fixed to the plunger 18 at its one end. The front end of the valve seat member 21 is normally placed in abutment against the separating portion 37 in the housing 32.

The through-holes 51 of the separating portion 37 of the housing 32 are formed in alignment with the front end of the valve seat member 21. The other ends of the pins 50 inserted into the through-holes 51 face the valve seat member 21 with a small gap therebetween. Further, the movable member 34 of the solenoid mechanism 30 is moved rearwardly by energizing the solenoid 31, whereby the pins 50 fixed to the movable member 34 move the valve seat member 21 rearwardly against the urging force from the spring 52 and the valve spring 25. Consequently, the poppet valve 26 is separated from the atmospheric valve seat 19 formed at the rear end of the plunger 18. Thus, the atmospheric valve 27 opens independently of the movement of the plunger 18, that is, the movement of the input rod 16.

A seal member 53 held on the inner circumference of the movable member 34 provides sealing between the movable member 34 and the hollow guide 17. The outer circumference of the movable member 34 is sealed by the seal member 33 against the housing 32. Thus, two pressure chambers 54 and 55 are formed at both ends of the movable member 34 respectively. The pressure chamber 54 formed on the front side of the movable member 34 communicates with the constant pressure chamber 7 provided on the front side through a passage 56 formed in the housing 32. The pressure chamber 55 formed on the rear side of the movable member 34 communicates with the variable pressure chambers 10,9 through a passage 57 formed in the separating portion 37 of the housing 32.

Now, operation of the brake booster having the above-mentioned construction will be explained.

The brake booster is installed in a vehicle (not shown) by means of plural stud bolts 58 provided on the backside face of the shell 1 (see FIG. 3), and a brake pedal (not shown) is connected to the input rod 16 in this state. Further, a master cylinder (not shown) is attached to the brake booster by means of a stud bolt 59 provided on the front side face of the shell 1. The output rod 47 is connected to a piston in the master cylinder in this state.

In the brake booster placed in the initial condition as shown in the FIGURES (FIGS. 1 through 3), the constant pressure chambers 7,8 and the variable pressure chambers 9,10 are both subjected to the given (negative) pressure, and the atmospheric valve 27 and the vacuum valve 28 are closed. In this condition, when the brake pedal is depressed to urge the input rod 16, the plunger 18 moves forward and separates the atmospheric valve seat 19 formed at the rear end thereof from the poppet valve 26, thereby opening the atmospheric valve 27. As a result, air flows into the variable pressure chambers 10,9 through the atmosphere passage 13, thereby creating a pressure difference between the variable pressure chambers 10,9 and the constant pressure chambers 7,8. Consequently, the power pistons 5,6 advance to generate thrust force which is transmitted to the output rod 47 through the valve body 11 and starts the braking action. In this initial braking condition, while the gap "S" between the pressure receiving plate 49 and the reaction disk 46 is being closed, so-called "jump-in" occurs, and the booster output force increases irrespective of the input force, thereby generating an adequate initial braking force.

After the jump-in ends, part of the output reaction force from the output rod 47 is transmitted back to the input rod 16 through the reaction disk 46, the pressure receiving plate 49 and the plunger 18. When the output reaction force (from the output rod 47) generated by the advancement of the valve body 11, becomes equal to the brake pedal pressing force, the atmospheric valve 27 is closed, thereby maintaining the booster output force. Further from this condition, when the brake pedal pressing force is increased or decreased to cause imbalance between the reaction force based on the pressure difference and the brake pedal pressing force, either the atmospheric valve 27 or the vacuum valve 28 is opened again, so that the reaction force based on the pressure difference becomes equal to the brake pedal pressing force, thereby adjusting the pressure difference caused between the variable pressure chambers 10,9 and the constant pressure chambers 7,8. Accordingly, when the solenoid 31 is not energized, the brake pedal pressing force is multiplied by a predetermined boost ratio, resulting in that the brake booster is operated as a normal brake booster.

In the automatic braking mode in which the solenoid 31 is energized by the electric current supplied to the solenoid 31, the electromagnetic force acts on the movable member 34 and shifts the movable member 34 towards the rear side. At that time, the pressure chamber 54 formed at the one end of the movable member 34 becomes equal in pressure to the constant pressure chamber 7 through the passage 56, and the pressure chamber 55 formed at the other end of the movable member 34 becomes equal in pressure to the variable pressure chamber 10 through the passage 57, gaps formed around the pins 50 in the through-holes 51 and the atmosphere passage 13. If the electric current supplied to the solenoid 31 increases, the electromagnetic force acting on the movable member 34 exceeds the total spring force of the spring 52 and the valve spring 25, and the movable member 34 is shifted toward the rear side, whereby the pin 50 fixed thereto moves the valve seat member 21 towards the rear side. As a result of this, the poppet valve 26 is separated from the atmospheric valve seat 19 formed at the rear end of the plunger 18 to open the atmospheric valve 27, thereby introducing air into the variable pressure chambers 10,9 and creating a pressure difference between the variable pressure chambers 10,9 and the constant pressure chambers 7,8. Consequently, the power pistons 5,6 advance and generate thrust force which is transmitted to the output rod 47 through the valve body 11, thereby starting the braking action.

When the air is introduced into the variable pressure chambers 10,9, the air is also introduced into the pressure chamber 55 provided at the other end of the movable member 34 through the passage 57 and the gaps around the pins 50 in the through-holes 51. Thereby, a pressure difference force caused by a pressure difference between the pressure chamber 55 and the pressure chamber 54 which is maintained at a negative pressure is created and acts on the movable member 34. This pressure difference force acts as the reaction force in the direction in which the movable member 34 is returned to the front side (i.e., the direction opposite to the direction of the electromagnetic force acting on the movable member 34). As a result, when constant electric current is supplied to the solenoid 31, that is, when constant electromagnetic force acts on the movable member 34, the movable member 34 is returned to the front side by means of the pressure difference force. At the moment when the electromagnetic force acting on the movable member 34 becomes equal to (i.e., balanced with) the pressure difference force, the shifting movement of the movable member 34 towards the front side stops, thereby closing the atmospheric valve 27, and the booster output force is maintained thereafter. Thus, two pressure chambers 54,55 formed at both ends of the movable member 34 constitute a reaction force mechanism that exerts a reaction force on the movable member 34 in proportion to the pressure difference between the variable pressure chambers 7,8 and the constant pressure chambers 9,10.

Further from this condition, if the electric current supplied to the solenoid 31 is increased or decreased to cause imbalance again between the electromagnetic force and the pressure difference force, both forces acting on the movable member 34, the movable member 34 is shifted again to balance the pressure difference force and the electromagnetic force, resulting in that either the atmospheric valve 27 or the vacuum valve 28 is opened, thereby adjusting the pressure in the variable pressure chambers 9,10 in accordance with the magnitude of the electric current supplied to the solenoid 31.

In this way, since the booster output force becomes proportional to the electric current supplied to the solenoid 31, by changing the electric current supplied to the solenoid 31 across a wide range, the booster output force can be adjusted across a wide range as well. Thus, it is not required to provide a sensor like the master cylinder pressure sensor which was required in the conventional techniques for controlling the booster output force at desired levels. Therefore, the construction of the brake booster can be simplified and the brake booster can be made cheaper.

In the control type brake booster that functions as described above, if air is introduced into the pressure chamber 55 formed at the other end of the movable member 34 before air is introduced into the variable pressure chambers 9,10, the pressure difference force acting on the movable member 34 i.e. the reaction force acting on the movable member 34, increases before an adequate booster output force is generated. As a result, the atmospheric valve 27 will be prevented from fully opening, causing a delay in introducing an adequate amount of air into the variable pressure chambers 9,10 and thus a delay in generating an adequate booster output force. The delay will manifest itself as a poor response of the automatic braking. To avoid that, according to the brake booster of the present invention, the total passage area of the passages 57 formed in the separating portion 37 of the housing 32 and the gaps around the pins 50 in the through-holes 51 (see FIG. 4) is made small so that the booster output force will increase at the same rate as the reaction force acting on the movable member 34 increases, or so that an adequate reaction force will be created at the same time or after the booster output force is generated. Thereby, until a sufficient booster output force is generated in response to the electric current supplied to the solenoid 31, the atmospheric valve 27 is kept open widely, improving the braking response. It is preferable that the total flow area of the passages 57 and the gaps around the pins 50 in the through-holes 51 is about 0.5–10 square millimeters.

In this way, since the brake booster of this invention is constructed so that the booster output force increases at the same rate as the reaction force acting on the movable member 34 increases, or so that an adequate reaction force is created at the same time or after the booster output force is generated, thereby improving the braking response in the automatic braking mode and increasing the reliability of the brake booster.

The above embodiment has been described, using a tandem type brake booster. It should however be appreciated that the present invention can also be embodied in a so-called single type brake booster having a single set of variable pressure chamber and constant pressure chamber.

Further, in the above embodiment, the passages 57 formed in the separating portion 37 of the housing 32 and the gaps around the pins 50 in the through-holes 51 function to introduce air into the pressure chamber 55. It should however be appreciated that only one of the passages 57 formed in the separating portion 37 of the housing 32 or the gaps around the pins 50 in the through-holes 51 may function to introduce air into the pressure chamber 55.

What is claimed is:

1. A brake booster comprising:
   a housing;
   a power piston dividing the interior of the housing into a constant pressure chamber and a variable pressure chamber;
   a valve body supported by the power piston;
   a plunger provided in the valve body for axial movement;
   an input rod interconnecting a brake pedal and the plunger so that an operation of the brake pedal is transmitted to the plunger to cause its axial movement;
   a valve mechanism provided in the valve body for controlling supply of operating fluid to the variable pressure chamber in response to the axial movement of the plunger so that a thrust output force is generated by pressure difference created between the variable pressure chamber and the constant pressure chamber based on the operation of the valve mechanism;
   an electromagnetic biasing means including a movable member for operating the valve mechanism independently from the operation of the input rod, the movable member slidably provided in the valve body; and
   a reaction force mechanism acting a reaction force on the movable member according to pressure difference between the variable pressure chamber and the constant pressure chamber,
   wherein, the reaction force mechanism acts the reaction force on the movable member so that an increasing rate of the thrust output force is in accord with an increasing rate of the reaction force.

2. A brake booster according to claim 1, wherein the valve mechanism includes an operating fluid valve which, when opened, permits the variable pressure chamber to communicate with a source of the operating fluid, a vacuum valve which, when opened, permits communication between the variable pressure chamber and the constant pressure chamber, the plunger having a portion forming a valve seat for the operating fluid valve, the movable member engaging with a valve seat member of the vacuum valve so that the movable member, when actuated, moves the valve seat member towards a direction of closing the vacuum valve.

3. A brake booster according to claim 1, wherein the reaction force mechanism has a pressure chamber formed at an end of the movable member and at least one passage communicating the pressure chamber with the variable pressure chamber, the passage designed its total flow area at 0.5–10 square millimeters.

4. A brake booster according to claim 3, wherein the valve mechanism includes an operating fluid valve which, when opened, permits the variable pressure chamber to communicate with a source of the operating fluid, a vacuum valve which, when opened, permits communication between the variable pressure chamber and the constant pressure chamber, the plunger having a portion forming a valve seat for the operating fluid valve, the movable member engaging with a valve seat member of the vacuum valve so that the movable member, when actuated, moves the valve seat member towards a direction of closing the vacuum valve.

5. A brake booster comprising:
   a housing;
   a power piston dividing the interior of the housing into a constant pressure chamber and a variable pressure chamber;

a valve body supported by the power piston;

a plunger provided in the valve body for axial movement;

an input rod interconnecting a brake pedal and the plunger so that the operation of the brake pedal is transmitted to the plunger to cause its axial movement;

a valve mechanism provided in the valve body for controlling supply of operating fluid to the variable pressure chamber in response to the axial movement of the plunger so that a thrust output force is generated by pressure difference created between the variable pressure chamber and the constant pressure chamber based on the operation of the valve mechanism;

an electromagnetic biasing means including a movable member for operating the valve mechanism independently from the operation of the input rod, the movable member slidably provided in the valve body; and a reaction force mechanism acting a reaction force on the movable member according to pressure difference between the variable pressure chamber and the constant chamber, wherein, the reaction force mechanism acts the reaction force on the movable member so that the reaction force is created at the same time or after the thrust output force is generated.

6. A brake booster according to claim 5, wherein the valve mechanism includes an operating fluid valve which, when opened, permits the variable pressure chamber to communicate with a source of the operating fluid, a vacuum valve which, when opened, permits communication between the variable pressure chamber and the constant pressure chamber, the plunger having a portion forming a valve seat for the operating fluid valve, the movable member engaging with a valve seat member of the vacuum valve so that the movable member, when actuated, moves the valve seat member towards a direction of closing the vacuum valve.

7. A brake booster according to claim 5, wherein the reaction force mechanism has a pressure chamber formed at an end of the movable member and at least one passage communicating the pressure chamber with the variable pressure chamber, the passage designed its total flow area at 0.5–10 square millimeters.

8. A brake booster according to claim 7, wherein the valve mechanism includes an operating fluid valve which, when opened, permits the variable pressure chamber to communicate with a source of the operating fluid, a vacuum valve which, when opened, permits communication between the variable pressure chamber and the constant pressure chamber, the plunger having a portion forming a valve seat for the operating fluid valve, the movable member engaging with a valve seat member of the vacuum valve so that the movable member, when actuated, moves the valve seat member towards a direction of closing the vacuum valve.

9. A brake booster comprising:

a housing;

a power piston dividing the interior of the housing into a constant pressure chamber and a variable pressure chamber;

a valve body supported by the power piston;

a plunger provided in the valve body for axial movement;

an input rod interconnecting a brake pedal and the plunger so that the operation of the brake pedal is transmitted to the plunger to cause its axial movement;

a valve mechanism provided in the valve body for controlling supply of operating fluid to the variable pressure chamber in response to the axial movement of the plunger so that a thrust output force is generated by pressure difference created between the variable pressure chamber and the constant pressure chamber based on the operation of the valve mechanism;

an electromagnetic biasing means including a movable member for operating the valve mechanism independently from the operation of the input rod, the movable member slidably provided in the valve body; and a reaction force mechanism acting a reaction force on the movable member according to pressure difference between the variable pressure chamber and the constant pressure chamber, wherein, the reaction force mechanism is provided with a pressure chamber formed at an end of the movable member and at least one passage communicating the pressure chamber with the variable pressure chamber, the passage having a limited flow area for limiting introducing of operating fluid into the pressure chamber.

10. A brake booster according to claim 9, wherein the valve mechanism includes an operating fluid valve which, when opened, permits the variable pressure chamber to communicate with a source of the operating fluid, a vacuum valve which, when opened, permits communication between the variable pressure chamber and the constant pressure chamber, the plunger having a portion forming a valve seat for the operating fluid valve, the movable member engaging with a valve seat member of the vacuum valve so that the movable member, when actuated, moves the valve seat member towards a direction of closing the vacuum valve.

11. A brake booster according to claim 9, wherein the total flow area of the passage is designed 0.5–10 square millimeters.

12. A brake booster according to claim 11, wherein the valve mechanism includes an operating fluid valve which, when opened, permits the variable pressure chamber to communicate with a source of the operating fluid, a vacuum valve which, when opened, permits communication between the variable pressure chamber and the constant pressure chamber, the plunger having a portion forming a valve seat for the operating fluid valve, the movable member engaging with a valve seat member of the vacuum valve so that the movable member, when actuated, moves the valve seat member towards a direction of closing the vacuum valve.

* * * * *